US008881474B2

(12) United States Patent
Tandler (10) Patent No.: US 8,881,474 B2
(45) Date of Patent: Nov. 11, 2014

(54) HOUSING AND MOUNTING ASSEMBLY FOR SKYLIGHT ENERGY MANAGEMENT SYSTEM

(71) Applicant: MBC Ventures, Inc., Baltimore, MD (US)

(72) Inventor: John Joseph Tandler, Arvada, CO (US)

(73) Assignee: MBC Ventures, Inc., Baltimore, MD (US)

( * ) Notice: Subject to any disclaimer, the term of this patent is extended or adjusted under 35 U.S.C. 154(b) by 0 days.

(21) Appl. No.: 14/032,584

(22) Filed: Sep. 20, 2013

(65) Prior Publication Data

US 2014/0165482 A1 Jun. 19, 2014

Related U.S. Application Data

(60) Provisional application No. 61/703,330, filed on Sep. 20, 2012.

(51) Int. Cl.
*E04B 7/18* (2006.01)
*E04D 13/03* (2006.01)

(52) U.S. Cl.
CPC .................................. *E04D 13/033* (2013.01)
USPC ............ 52/200; 52/309.1; 126/683; 126/704; 126/711

(58) Field of Classification Search
USPC ............ 52/200, 204.5, 272, 287.1, 309.1, 70, 52/80.1; 126/569, 621, 623, 683, 684, 126/698, 701, 702, 704, 707, 711
See application file for complete search history.

(56) References Cited

U.S. PATENT DOCUMENTS

| 4,173,854 A | 11/1979 | Wallerstein |
| 4,488,791 A | 12/1984 | Hinchliffe |
| 4,498,455 A * | 2/1985 | Gramm ........................ 126/569 |
| 4,509,825 A | 4/1985 | Otto et al. |
| 4,663,905 A | 5/1987 | Schulz |
| 2002/0001133 A1 | 1/2002 | Magee |
| 2007/0235021 A1 | 10/2007 | Reed et al. |
| 2009/0173375 A1 | 7/2009 | Frazier et al. |
| 2011/0091675 A1 | 4/2011 | Simpson et al. |
| 2011/0138712 A1* | 6/2011 | Demogenes ................... 52/200 |

* cited by examiner

*Primary Examiner* — William Gilbert
*Assistant Examiner* — Patrick Maestri
(74) *Attorney, Agent, or Firm* — Whiteford, Taylor & Preston, LLP; Gregory M Stone (57) ABSTRACT

Disclosed is a housing and mounting assembly for a skylight module, and particularly for a skylight module that incorporates an energy management system. The housing and mounting assembly is configured to efficiently capture both direct solar and diffuse ambient light, and deliver light that is diffuse to the space below the skylight that provides even illumination and no unpleasant glare spots. The walls of the skylight module may be formed of multi-wall polycarbonate panels configured to redirect both the upward- and downward-shining light through the aperture into the space below. Moreover, the curb of the assembly may include a flexible flashing strip provided with a reflective coating configured to reflect sunlight upward through the walls of the assembly and into the skylight module, such that the advantages of collecting and using such reflected light can be achieved even in a retrofit installation on a non-reflective roofing surface.

18 Claims, 9 Drawing Sheets

HOUSING AND MOUNTING ASSEMBLY FOR SKYLIGHT ENERGY MANAGEMENT SYSTEM

CROSS REFERENCE TO RELATED APPLICATION

This application is based upon and claims benefit of U.S. Provisional Patent Application Ser. No. 61/703,330 entitled "SKYLIGHT ENERGY MANAGEMENT SYSTEM," filed with the U.S. Patent and Trademark Office on Sep. 20, 2012 by the inventor herein, the specification of which is incorporated herein by reference in its entirety.

FIELD OF THE INVENTION

This invention relates to radiant energy management, and more particularly to a housing and mounting assembly for use with systems for capturing solar energy to manage illumination and temperature within a defined space.

BACKGROUND OF THE INVENTION

Solar generation and cogeneration systems can offer a logical alternative or addition to fossil fueled energy systems as fuel costs and environmental concerns increase. The solar heat that is collected in a collection system, with or without electricity (such as by way of photovoltaic cells), may provide a major boost to an energy system's value. Unfortunately, however, "solar cogeneration" systems need to be located at the site of use, which presents challenges to most existing or previous concentrator methods. Because the collected heat generally is at low temperature (e.g., typically 40-80 degrees C.), the heat energy cannot be transmitted far without substantial parasitic losses. Further, the capital cost of hot water and other heat transmission systems favors direct on-site use. And, such low temperature heat generally cannot be converted in a heat engine to mechanical or electrical power because of the small temperature differential versus ambient temperatures. Accordingly, systems are needed that harvest light energy and transfer the harvested energy easily to the heating requirements at the site of use, such that the immediate needs of the site are factored into how the system is controlled.

Solar cogeneration technologies are, in part, held back by challenges in creating optical systems that are both inexpensive and that can be mounted or integrated into a building. One problem is the practical limit for how tall a design can be to withstand forces from windy conditions on the device and building on which it may be mounted. Tying a cogeneration apparatus into the foundation or load bearing structure of a building creates expensive installations and/or mounting systems to accommodate system stresses, particularly on the roof. Many commercial sites lack sufficient ground space for a reasonably sized system, and roof-mounting is the only viable option to obtain sufficient collector area.

Efforts have been made to meet the foregoing challenges. For instance, MBC Ventures, Inc., the assignee of the instant application, has developed solar harvesting apparatus and methods and their incorporation into building structures, as described in co-owned U.S. Patent Publication No. US2009/0173375 titled "Solar Energy Conversion Devices and Systems" (U.S. application Ser. No. 12/349,728), and co-owned U.S. Patent Publication No. US2011/0214712 titled "Solar Energy Conversion" (U.S. application Ser. No. 13/056,487), both of which specifications are incorporated herein by reference in their entireties. While such systems provide significant improvement over prior solar harvesting systems, opportunities remain to enhance the reliability, reduce cost, and improve the performance of such systems.

Moreover, a skylight energy management system that improves upon such prior apparatus and methods are set forth in co-owned U.S. Patent Publication No. US2013/0199515 titled "Skylight Energy Management System" (U.S. application Ser. No. 13/749,053), the specification of which is incorporated herein by reference.

Nonetheless, a consideration with such prior apparatus, along with skylight fixtures previously known in the art, is the challenge they present in capturing both diffuse and ambient light, in addition to direct solar light. More particularly, skylights provide an opening in the roof of a building to allow natural light to enter a building, which can reduce the energy consumption required for artificial lighting as well as bring health and productivity benefits to the occupants. In order to maximize these benefits, it would be desirable for skylights to efficiently capture both direct solar and diffuse ambient light, and deliver light that is diffuse to the space below that provides even illumination and no unpleasant glare spots. Skylights mounted on flat-roofed commercial buildings are generally made of semi-transparent glass or plastic materials which in some cases have light attenuating and diffusing features added to them, such as coloration or prismatic lensing.

Skylights are generally mounted on a roof curb. The curb typically comprises a waterproofing and structural feature that fixes the skylight to the roof over the opening and maintains the waterproof seal from the perimeter of the skylight down to the roofing membrane. The curb must be structurally strong enough to withstand the wind- and snow-driven structural loads to which the skylight is subjected, and to transfer the loads to the roof structure. The curb must also be completely watertight so that any standing or flowing water or melting snow will not leak through the curb into the space below. Curbs are generally made of sheet metal, wood or other structural members and are generally flashed to the roofing material using similar materials as the roof membrane itself. Generally, all of these materials are opaque to the transmission light. The required height of the curb above the roof surface is a function of the local building codes, which are dependent on local climate and the type of roof. In climates with significant snow or high rainfall levels, the height of the curb above the roof surface can be as high as 12 to 14 inches. This implies that the light coming from the skylight must pass through a channel which impedes the flow of light from the skylight down into the space below. This space that exists from the bottom plane of the skylight down to the open area at the bottom of the curb is called the light well. Efficiency of transmission of light through the light well is a function of the geometry (the length and width of the walls) as well as the optical properties of the walls of the light well. Typical light well efficiencies range from 75% to close to 95% if highly reflective materials are used for the walls of the light well. These reflective materials add expense to the cost of the skylight without adding any additional light.

Furthermore, a significant fraction of the cooling load on a large flat roofed building is typically due to the solar heat gain on the roof surface, which is conducted through the structure into the space below. A common solution to reduce this heat load that has been introduced in recent years is to form the surface of the roof of a highly reflective material so that the top layer of the roof stays cooler and less heat is conducted into the building, thus significantly reducing the cooling load of the space below.

A current common commercial roofing practice employs highly reflective material made of thin rubber sheet that is coated on the top side with a white or silver highly reflective coating. The intended effect of these coatings is to simply reflect the sun's rays back to the sky and keep the heat out of the building. However, the bright diffuse light that is reflected from the surface of the building also represents an opportunity to provide additional light to a skylight that is mounted on such a roof. Many of these roof coatings have highly diffuse reflection, which means that the sun's rays that strike the roof are then scattered in all directions. A skylight that has a near-vertical surface area can thus receive a significant amount of diffuse light flux as a result of this reflected and scattered light. Over the course of a day, this flux can be 50 to 100% of the direct flux from the sky. In such a construction, this reflected light would strike the skylight from an angle below the horizon; however, existing skylights are not designed to capture light that strikes them from below.

Thus, there remains a need in the art for a simple, easy-to-install skylight construction that is capable of capturing and making use of direct solar along with both diffuse and ambient light, and moreover that can make use of light reflected off of the roof surface to add to the lighting function performed by such skylight.

SUMMARY OF THE INVENTION

Disclosed herein is a housing and mounting assembly suitable for use with skylight assemblies, and particularly with skylight energy management systems as described in copending and co-owned U.S. patent application Ser. No. 13/749,053 titled "Skylight Energy Management System."

In order for the reflected solar resource discussed above to be harvested and brought into the building, the skylight should preferably A) have vertical surfaces that have a view of the roof surface, and B) have optics that can redirect both the upward- and downward-shining light through the aperture into the space below. Use of this scattered light as a resource for daylighting has several important advantages. First, a significant expense in the installation of any skylight is the cutting and sealing of the opening which creates the aperture for the light transmission. Making use of the scattered light from the roofing material that is adjacent to the skylight effectively increases the light available to be transmitted through the skylight without increasing the opening. That is, the same amount of light may be transmitted through a smaller roof opening, thus saving significant cost in the installation. Secondly, the light that is reflected from a bright white colored roof is diffuse, scattered light. One of the principal functions of a skylight is to take the sun's direct rays and scatter those rays, which makes more efficient use of the light and is more pleasing to the occupants in the space below. Indeed, a significant amount of the expense of construction of state-of-the-art skylights goes into optical features which are intended to do this scattering and diffusing of the sun's rays. The light reflected from the roof that is already pre-scattered does not need to be re-scattered by the skylight. Therefore, the expensive diffusing optical features of the skylight that are necessary to diffuse direct bright sunlight are not necessary when transmitting the light which has already been scattered by the bright reflective roofing. The assembly described herein provides a skylight assembly, such as one suitable for integrating an energy management system, that includes a transparent wall and very low profile curb that maximize the use of direct solar along with both diffuse and ambient light, and particularly of light reflected off of the roof surface.

BRIEF DESCRIPTION OF THE DRAWINGS

The numerous advantages of the present invention may be better understood by those skilled in the art by reference to the accompanying drawings in which.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
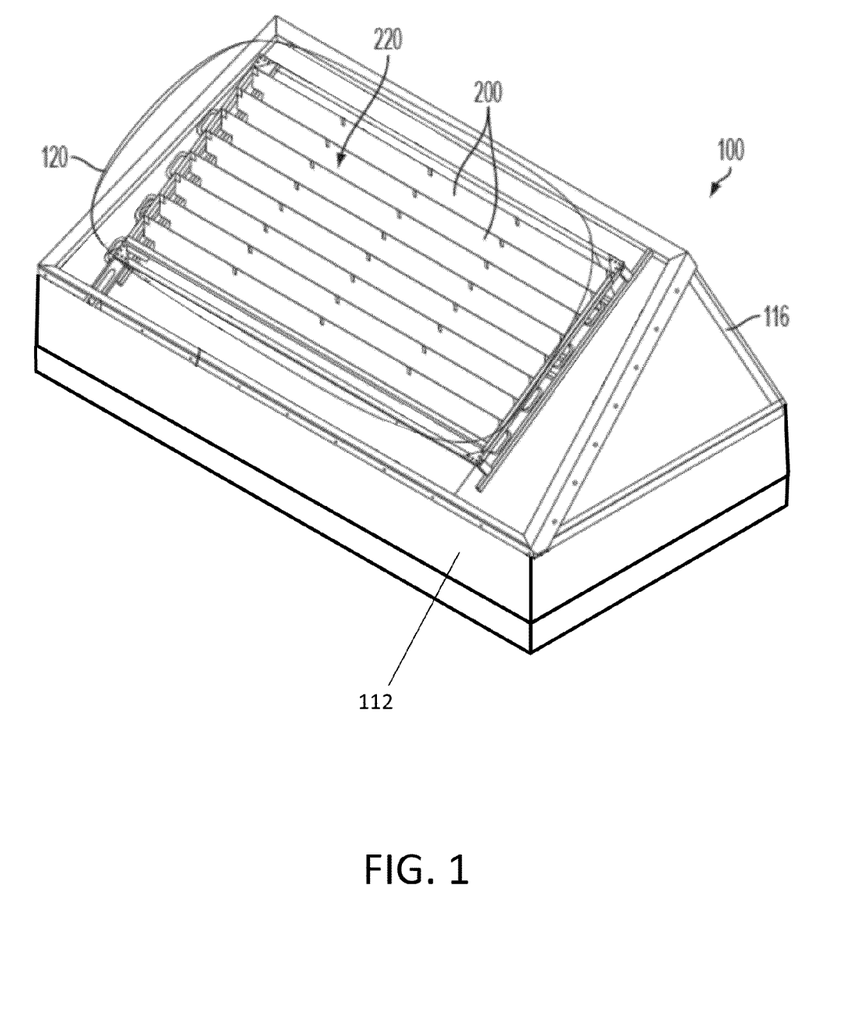
FIG. 1 is a perspective view of a skylight module in accordance with an aspect of a particularly preferred embodiment of the invention.

FIG. 1 shows a perspective view of an exemplary skylight module (shown generally at 100) which may incorporate the housing and mounting assembly set forth herein. The skylight module 100 is configured for installation in, for instance, the roof of a building, such as a commercial building. In accordance with an exemplary embodiment of the invention, the module is configured to provide approximately 50-70 percent more daylighting than standard daylighting solutions, as well as generating thermal heat at temperatures of up to 300 F. This is accomplished by providing a higher skylight to floor ratio (SFR) than typical skylight installations. The larger aperture is used to provide full interior illumination during cloudy, morning and afternoon periods. The solar energy that is in excess of that required for illumination is captured by a single axis micro-concentrating collector embedded in the skylight, making the energy available to offset building thermal loads while relieving the building cooling system of the solar heat load that would be coming through such a large roof opening.

The skylight module 100 includes louvers 200, which in turn include a thermal receiver 300 (FIG. 2) on the back of the louvers that is preferably relatively small in size, such that it is possible to have a high degree of focus of the mirror system. A small thermal receiver (as described herein) has a proportionally reduced heat dissipation rate for the same heat input, and thus increases the efficiency of the thermal collection, and consequently increases the peak collection temperatures up to about 220 F. The heat collected from such assembly may be put to various uses, including service water heating, space heating, and some process heat applications including driving single effect absorption chillers for air conditioning.

With particular regard to the skylight energy management system shown in FIG. 1, the system provides the means to seamlessly vary the amount of lighting delivered by each skylight module 100 in real time, with the balance of the solar energy not going into daylighting being captured in the form of thermal heat. Moreover, and again with particular regard to the system shown in FIGS. 1 and 2, louvers 200 may be provided with a thermal receiver 300 that increases the collection temperature to the range of 275 F to 300 F, thus providing more high-value applications of the heat, such as double effect chillers with up to double the cooling value per unit of heat input, and also power generation using organic Rankine cycle or Kalina cycle turbine/generator systems. Alternatively, improving the collection efficiency in the 200-220 F range greatly improves the economics of thermal process heat applications such as single effect chillers. The exemplary system shown in FIG. 1 incorporates improved optics that provide a concentration ratio of 10 to 15, resulting in a smaller thermal receiver area and temperatures high enough to drive these higher value loads, and greater efficiency at lower temperatures. Being able to drive loads that provide efficient cooling and power generation vastly expands the number of applications for the system, because many more buildings have need for cooling and power than more application-specific process heat uses.

Figure 2:
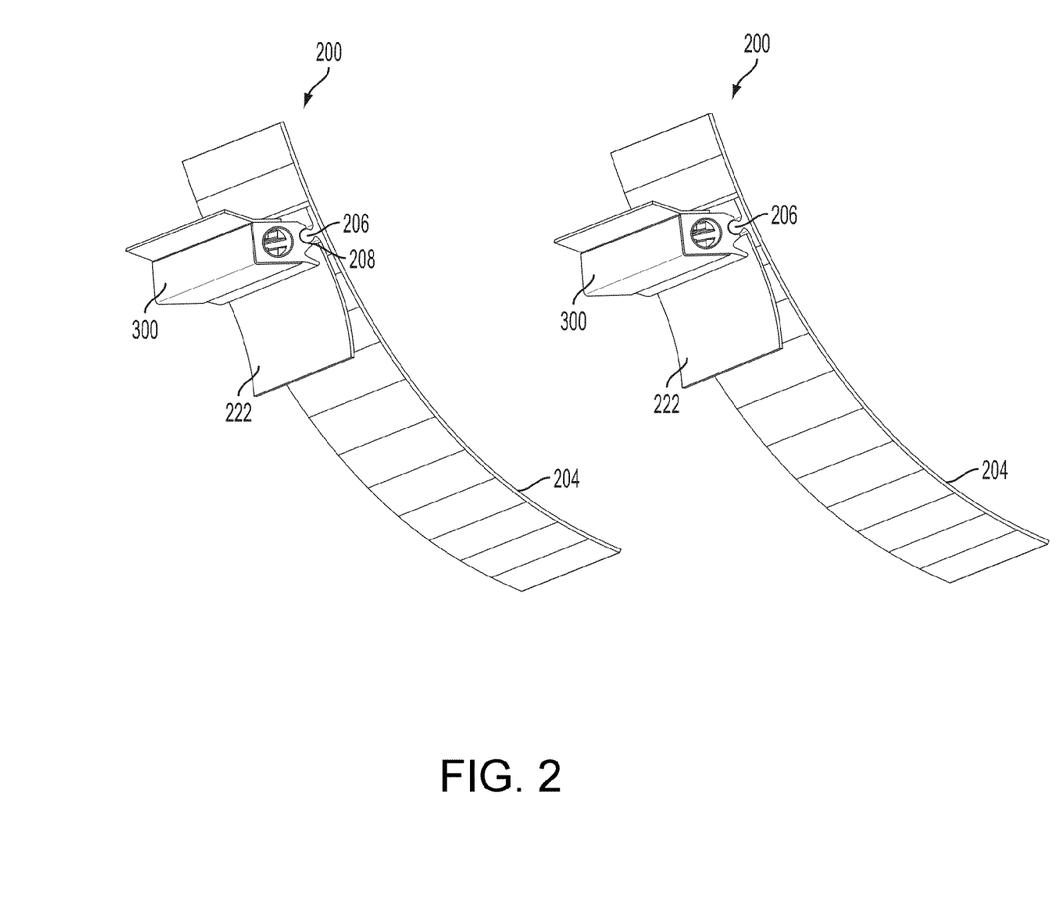
FIG. 2 is a side perspective sectional view of two louvers for use with the louver assembly of FIG. 1.
Figure 3:
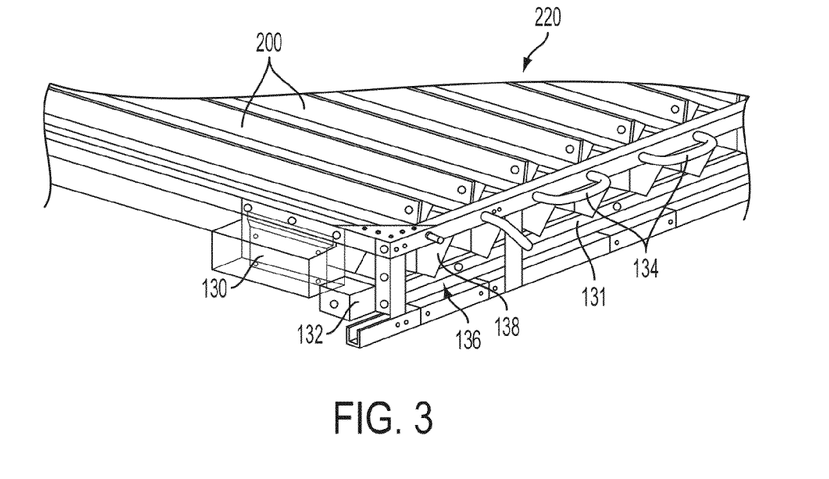
FIG. 3 is a perspective view of a louver assembly for use with the skylight module of FIG. 1.

With reference to FIGS. 1-3, the monitor 116 (skylight housing) provides 1) structural support to the energy conversion module/louver assembly 220 (ECM), 2) thermal insulation between inside air and the outside, and 3) direction and diffusion for the light from outside of the skylight monitor 116 into the space below. The ECM 220, mounted on the south face of the monitor 116 (assuming, for instance, a North American installation in which the south face is facing the sun), is a micro-concentrating thermal collector and light managing device. A controller board 130 and a small electric stepper motor 132 control the angle of the louvers 200 to deliver the desired amount of light through the ECM 220, while converting the excess light to high grade thermal heat. Fluid lines 134 circulate coolant directly through each louver 200 to pipes located on the roof or in the ceiling space below the skylight modules 100.

Figure 3A:
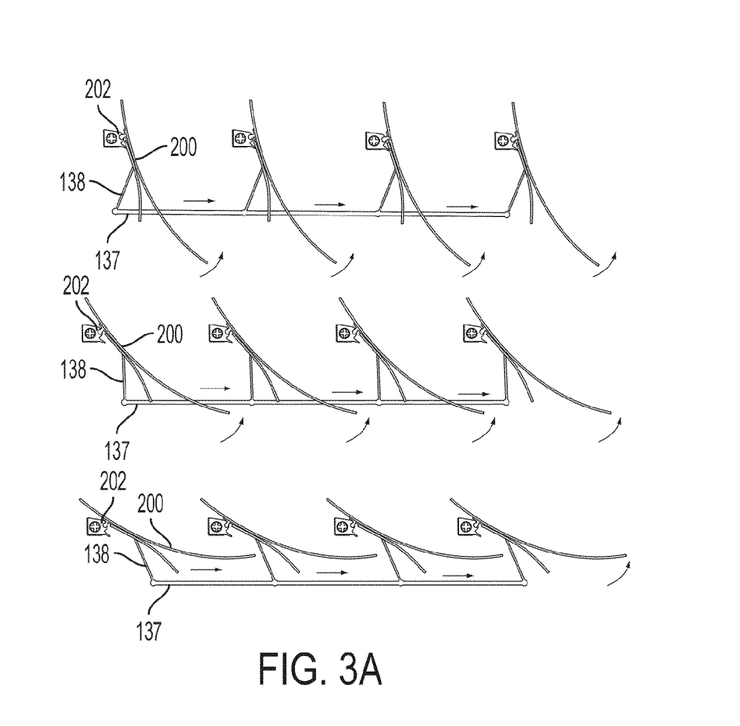
FIG. 3a is a schematic side view of various operational modes of the louver assembly of FIG. 3.

The louvers 200 are moved by stepper motor 132 and linkage 136 which is located on, for example, the west end of the ECM 220. The controller board 130 is preferably connected to a central control unit and sends commands to the stepper motor 132 which is connected to an actuation bar 137 of linkage 136. The actuation bar 137 is joined to each louver 200 by link arms 138 that connect preferably to the last inch of the west end of the louver 200. The action of the linkage is shown in the schematic views of FIG. 3A with a cross section of four louvers. The actuation bar 137 moves left to right with a small vertical component as the link arms 138 swing in a circular motion as the louver 200 pivots around a slot pivot 202 on the back of each receiver tube. In an exemplary embodiment of the invention, the receiver tubes do not articulate. This allows for fixed fluid connections to the fluid lines 134 that connect the thermal receivers, an improvement from prior designs that required dynamic fluid seals between the receiver tubes and the fixed fluid tubes.

FIG. 2 shows cross sections of two louver sections to show additional detail. The mirror 204 of louver 200 can be either continuously curved or have a faceted shape. The facets are much easier to fabricate with simple sheet bending equipment; the continuously curved design requires custom tooling and high-force hydraulic presses to fabricate. The radius of curvature of the mirror 204 varies along its length to optimize the focusing of light on the thermal receiver 300 and secondary reflecting surfaces (described in greater detail below). The portion of the mirror 204 near the top is generally farther away from the adjacent receiver/reflector surfaces and so requires a larger radius of curvature (less curved shape). The portion of the mirror 204 near the bottom is generally presented with a shorter distance to the adjacent receiver and so requires a smaller radius of curvature to focus the light. In an exemplary embodiment of the invention, the mirror 204 is attached to a pivot bar 206 that runs the length of the mirror 204 (or alternatively may consist of short sections to reduce thermal conductivity and losses). The pivot bar 206 has a linear bulb that fits into a slot 208 on the back of the receiver tube 300 to provide a pivot point for rotation. It is important to minimize the thermal conductivity between the hot receiver tube 300 and the mirrors 204 to keep the mirrors 204 from becoming cooling fins. Therefore, the pivot bar 206 is preferably attached to the mirror 204 with silicone foam tape which has a low thermal conductivity but can withstand the high temperatures of the thermal receiver 300. In addition, the outer surface of the linear bulb may be coated with Teflon or other high-temperature insulating plastic to minimize thermal conduction from the thermal receiver tube 300 to the pivot bar 206.

As best shown in FIG. 2, and again in accordance with an exemplary embodiment of the invention, also attached to the pivot bar 206 is the reflecting diffuser 222. The reflecting diffuser 222 directs the rays of sunlight that strike it into the space below. The reflecting diffuser 222 (as well as the secondary mirror on the thermal receiver tube 300, discussed below) is made of specialty lighting reflector sheet that is partially specular and partially diffuse. Such specialty lighting reflector sheet material is readily commercially available, and may comprise, by way of non-limiting example, ALANOD 610G3 available from ALANOD GMBH & CO. KG, or ACA 420AE/DG available from ALUMINUM COIL ANODIZING CORP. The material reflects incoming light rays into a 20 degree cone which provides more diffuse projection into the space below while maintaining the directionality of the light. A purely diffuse reflector, such as a white painted surface, while providing soft light to the space below, would waste light by reflecting some of it back towards the primary mirror. A purely specular reflector, such as a polished reflector, would direct all of the light efficiently into the space, but would require secondary conditioning to avoid harsh glare spots. The shape of the reflecting diffuser 222 can either be curved, as shown in FIG. 2, or straight. The main criteria in configuring the reflecting diffuser 222 is that the reflecting diffuser intercept preferably all light rays that come from the primary mirror 204 at the shallow angle so that they do not get re-reflected back to the primary mirror 204 and lost.

Figure 4:
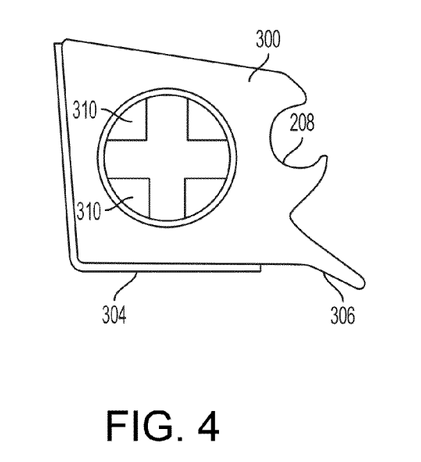
FIG. 4 is a side view of a thermal receiver tube.
Figure 5:
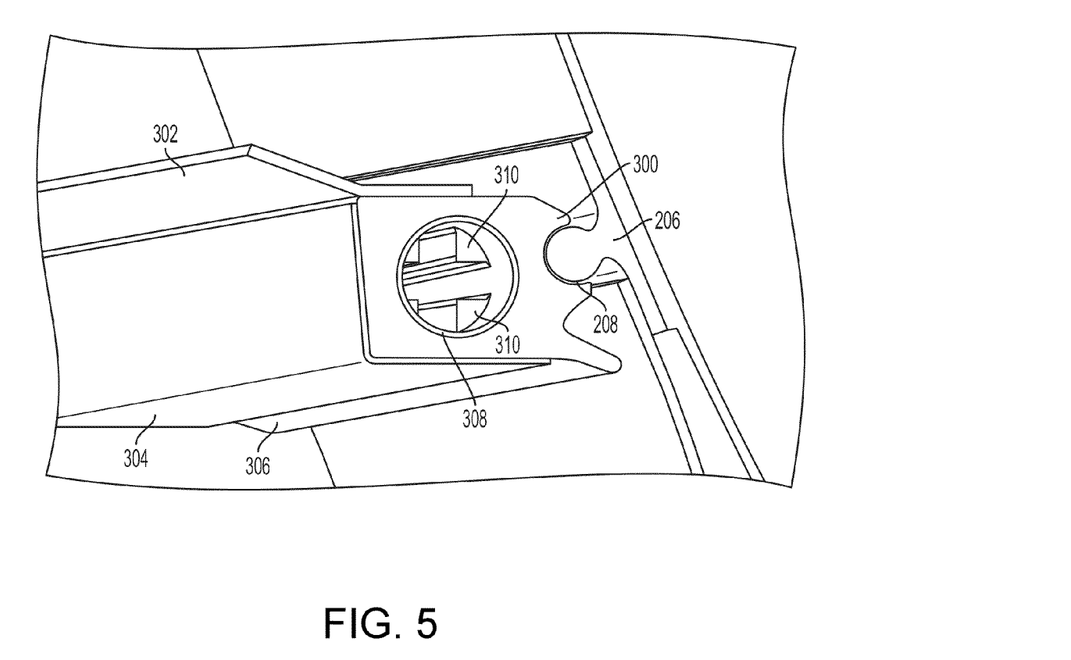
FIG. 5 is close-up view of one of the louvers of FIG. 2.

The details of the thermal receiver tube 300 in accordance with such exemplary embodiment are displayed in the cross-sectional views of FIGS. 4 and 5. The main body of the thermal receiver 300 is preferably formed of extruded aluminum. To the base extrusion, three features are attached using high-temperature epoxy adhesives: a thermal baffle 302, a thermal collector 304, and a secondary mirror 306. The operation and further details of such assembly are set forth in full in U.S. Patent Application Publication No. US2013/0199515, and are thus not discussed further here.

As mentioned above, the foregoing assembly is housed within the overall housing of skylight monitor 116, and sits atop curb 112 as shown in FIG. 1 (which curb 112 is the assembly that integrates the overall skylight module 100 with the roof of the building on which it is installed).

The wall of curb 112 is transparent, and is preferably fabricated from multi-wall polycarbonate panels. An exemplary polycarbonate multi-wall panel is, for example, readily commercially available from POLYGAL NORTH AMERICA. This material is extruded from clear polycarbonate plastic to form panels 1 to 1.5 inches thick. The cross section of the panels is such that the thickness of any one layer of the polycarbonate is only between five and 30 mils in thickness. However, the cross-linked shape of the cross-section gives the multi-walled polycarbonate sheets a great deal of strength, toughness, and resistance to thermal heat conduction compared to a single bulk sheet of the same mass of material. The linear nature of the extruded inner walls of the sheets have a very particular light-diffusing characteristic which if combined with other elements can play an important role in diffusing direct ambient light. Light rays that pass through the outer face sheet undergo a series of partial internal reflections which has the effect of broadly scattering the light rays in a plane perpendicular to the grain of the extrusion. When used by itself, this creates a bright band of light which creates undesirable glare. However, if a multiwall polycarbonate sheet is combined with a complementary optical feature that scatters light in an orthogonal direction, then a smooth diffuse effect can be achieved.

Figure 6:
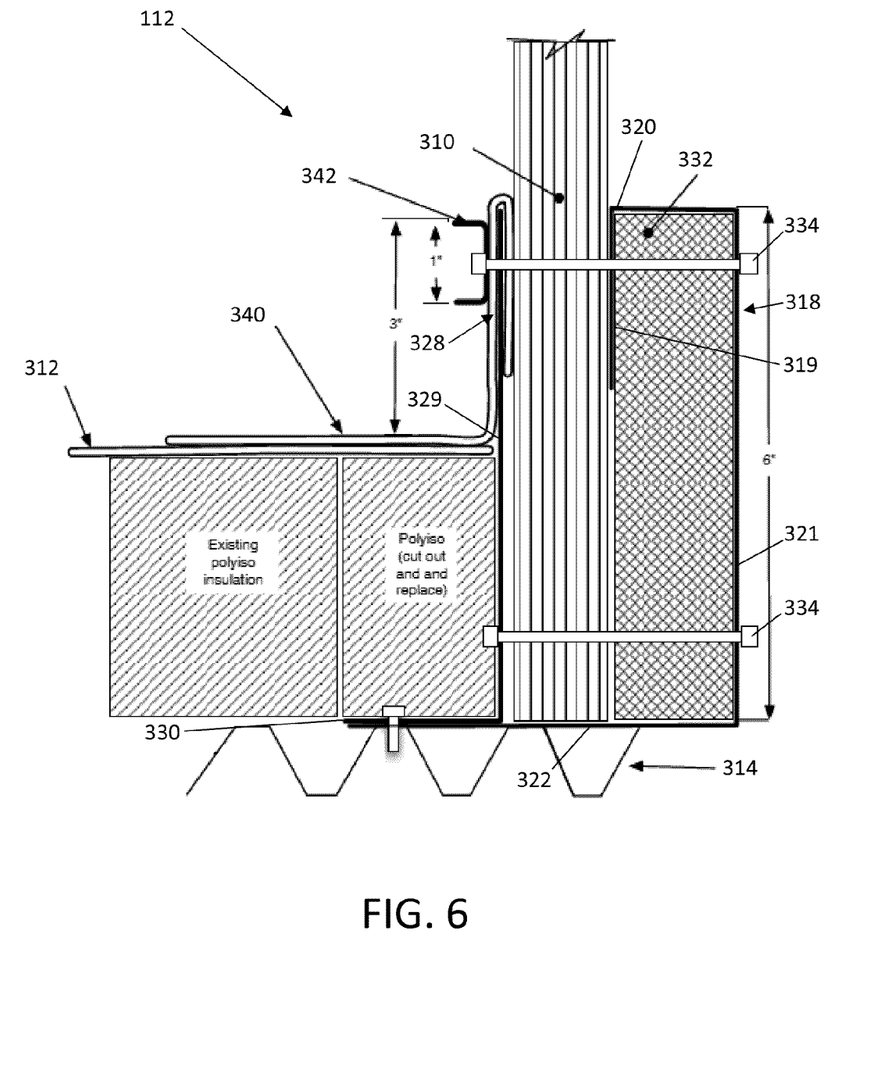
FIG. 6 is a detail, cross-sectional view of a curb assembly of the skylight module of FIG. 1.

With regard to one aspect of an embodiment of the invention, and as shown more particularly in FIG. 6 (generally showing a close-up sectional view of curb 112), the polycarbonate sheets 310 of monitor 116 extend below the waterproofing plane 312 of the roof and go down to the corrugated steel decking 314 which is below the insulation 316. The multi-wall polycarbonate sheets 310 are sandwiched between a first metal sheet 318 and a second metal sheet 328. First metal sheet 318 includes a polycarbonate sheet-facing panel 319 that mates against one edge of polycarbonate sheet 310, a flat, top edge 320 extending at a 90 degree bend from sheet-facing panel 319, a downward leg 321 that runs in a direction parallel to sheet-facing panel 319 down to a point that is even with the bottom of polycarbonate sheet 310, and bottom edge 322 that extends in a direction parallel to top edge 320 that extends a sufficient length to extend under and past polycarbonate sheet 310 and thereafter under insulation 316 that is positioned adjacent polycarbonate sheet 310. Likewise, second metal sheet 328 includes a polycarbonate sheet-facing panel 329 and a bottom edge 330 that runs parallel to and sits atop a portion of bottom edge 322 of first metal sheet 318. A stiffener, such as a piece of lumber 332, and by way of non-limiting example a section of 2×6 lumber, sits within an interior perimeter of first metal sheet 318, which section of lumber adds stiffness to the curb 112 and provides a place for screws to hold. Preferably, bolts or similarly configured fastening or clamping devices 334 extend through first and second metal sheets 318 and 328, and through multi-wall polycarbonate sheet 310, to clamp polycarbonate sheet in place. The construction of the multi-wall polycarbonate sheet 310 and its thickness provides a vertical surface which has adequate toughness and durability to withstand the loads of the skylight mounted on top of it as well as other incident loads such as wind or objects which may try to penetrate the walls.

Typically, skylight curbs are provided with bare sheet metal sides, and the installer provides flashing material and adhesives to seal the flashing to the curb and then to the roof surface. In accordance with another aspect of an embodiment of the invention, and with continued reference to FIG. 6, a strip of flexible rubber flashing material 340 is preferably pre-integrated with the skylight at the factory and fixed to the outer surface of the curb 112 using a structural channel 342 as a clamp. Such rubber flashing 340 is positioned against the exterior face of polycarbonate sheet 310, extends over the top edge of second metal sheet 328, extends downward parallel to sheet-facing panel 329 of second metal sheet 328 to the existing waterproofing plane 312 of the roof, and then outward from curb 112 and polycarbonate sheet 310 on top of, and preferably sealed to, the existing roof membrane. This provides several major advantages over previously known configurations. First, the sealing of the flashing to the curb is done in a production environment with lower cost labor. Second, the number of field operations is significantly reduced, such that installation costs are reduced. More significantly, the flashing that is provided can then be comprised of the highly reflective material that provides the desirable diffuse light in the vicinity of the skylight module 100. In this way, skylights can be retrofitted on roofs that do not have highly reflective surfaces and still have the advantage of capturing the diffuse reflected light.

Figure 7:
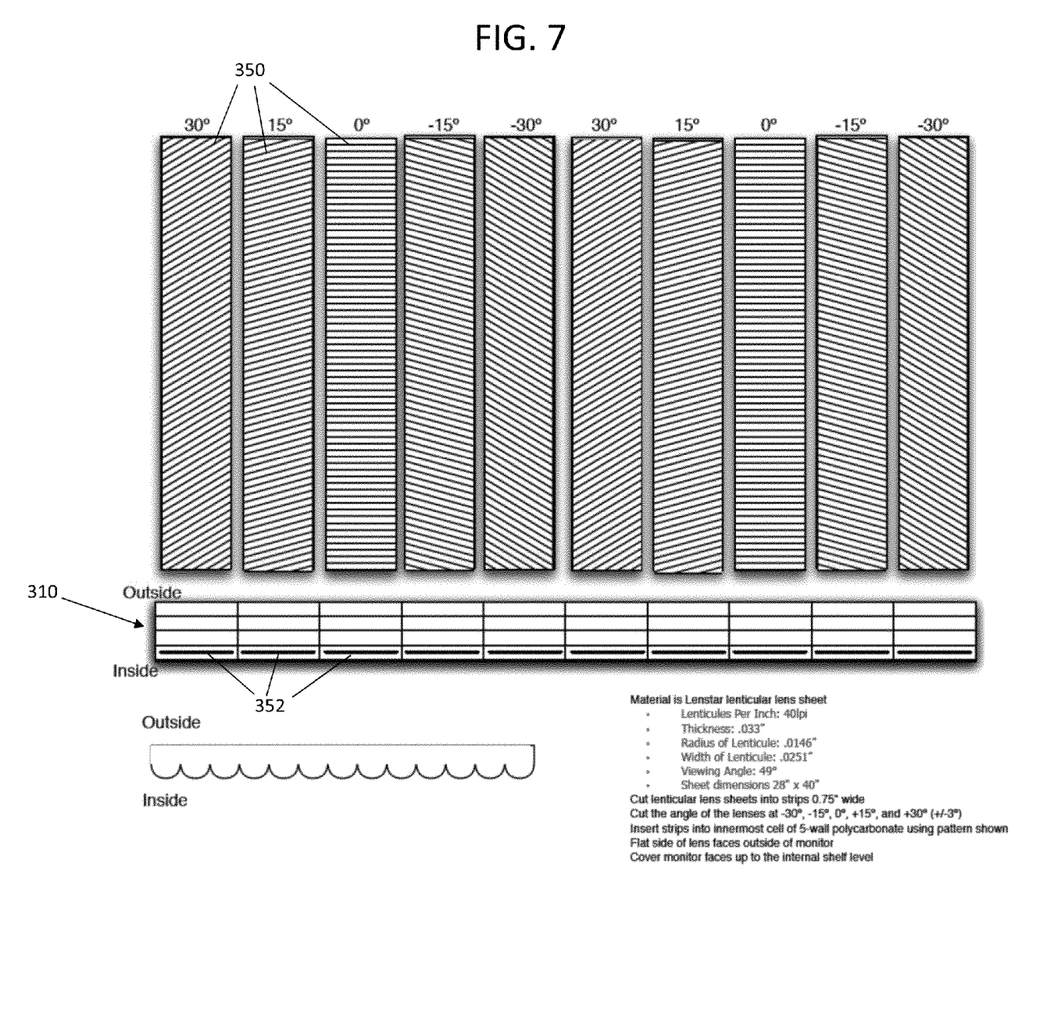
FIG. 7 is a schematic view of a plurality of strips of diffusing material for use with the skylight module of FIG. 1.

When mounted on a roof that has a highly reflective surface in the vicinity of the skylight module 100, light can strike the vertical walls of the curb 112 from two directions. Specifically, both direct sunlight from the sun as well as diffuse sky radiation strikes the walls from an angle above the horizon. The light that is reflected and scattered from the reflective roof surface strikes the walls from an angle below the horizon. To make good use of this light resource which strikes these vertical surfaces, the skylight should preferably direct these two light streams that approach in different directions downward through the aperture. Further, the direct component of the sunlight that comes from above should preferably be diffused in two directions to create pleasing diffuse light. A method for capturing the diffuse light scattered from the roof and direct sky radiation through the aperture of skylight module 100 is to attach light managing surfaces and materials to either the inside or the outside surface of the multi-wall polycarbonate sheets 310 of a skylight monitor 116. However, attaching such materials may present problems in the accumulation of dust and dirt for materials that are attached to the inside, and weathering for materials that are attached to the outside, in addition to the cost of the attachment mechanism, whether by adhesion or mechanical fastener. An alternative for capturing the diffuse light scatter from the roof and direct sky radiation through the aperture of the skylight module 100, which keeps the light managing surfaces protected from both the inside and outside environments, is to place them inside of the cells of the multiwall polycarbonate sheets 310. A diffuser sheet, such as a lenticular lens sheet that is commercially available from LENSTAR, that has sufficient rigidity to support itself can be cut into strips and placed into the cells of the multi-wall polycarbonate sheets, particularly as shown in FIG. 7. A lenticular lens sheet is cut into strips 350 that are preferably 0.75 inches wide, and cut so that the resulting angles of the lenses are −30°, −15°, 0°, +15°, and +30° (+/− 3°). Those strips are then placed within the innermost cells 352 of a preferably five-wall polycarbonate sheets 310 in the pattern shown in FIG. 7 (i.e., from +30° to +15° to 0° to −15° to −30° to +30° to +15° to 0°, etc.). The flat side of the lenticular lens material is positioned to face the outside of skylight monitor 116, and the faces of skylight monitor 116 are preferably covered over at least a portion of each face.

Figure 8A:
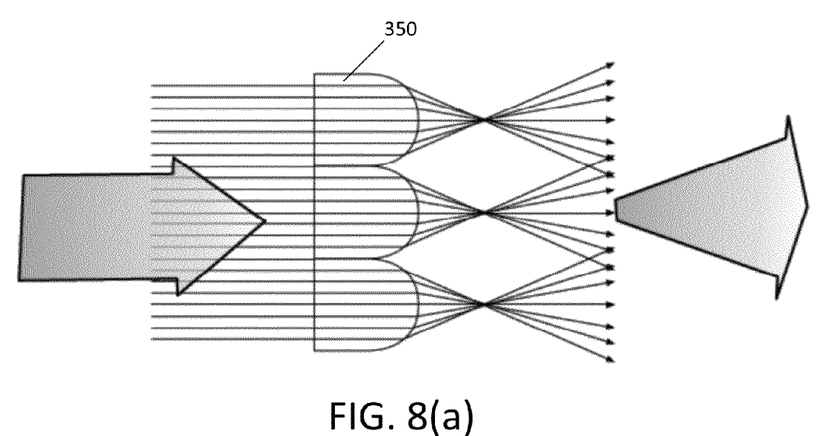
FIGS. 8(a) and 8(b) are schematic light diagrams showing the effect of light passing through the diffusing material of FIG. 7.
Figure 8B:
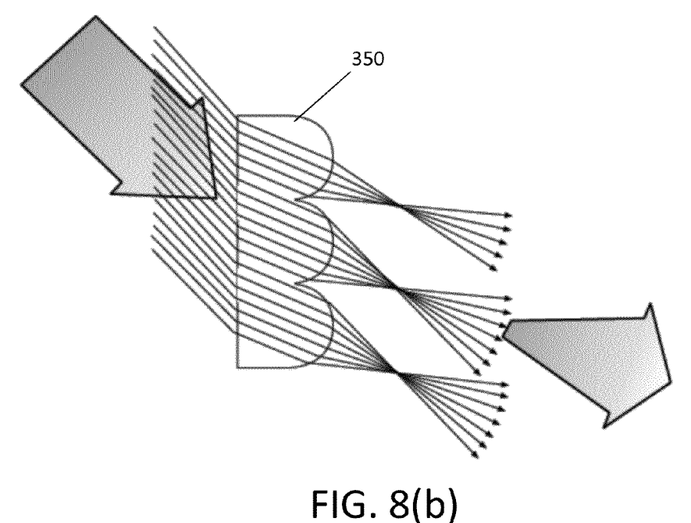

The use of such lenticular lens strips 350 within innermost cells 352 of polycarbonate sheets 310 provide beneficial diffusing effects. When the light strikes the flat side of the lens 350 at a normal angle, as shown in FIG. 8(*a*), the light is scattered evenly at an angle that is a function of the curvature of the lens in the index of refraction of the material. Half-beam width angles of 53° are achievable using polyester (PET) lenses. Likewise, when incoming light strikes the flat side of the lens 350 at an angle away from the normal as shown in FIG. 8(*b*), the light is scattered, but it is also uniformly refracted in accordance with Snell's law in a direction towards the normal to the plane of the lens. The combination of uniform scattering and bias towards the normal angle is beneficial in several ways. The fact that the scattering of the light is uniform over a wide-angle increases the uniformity of the light projected onto the work plan below the skylight. Most other diffusing mechanisms have much less even distribution with the majority of the light energy being disbursed less than 30° from the original beam. The biasing towards the normal helps to project the direct light from above the horizon more evenly away from the walls of the skylight so as to avoid the creation of hotspots on the floor below.

Figure 9:
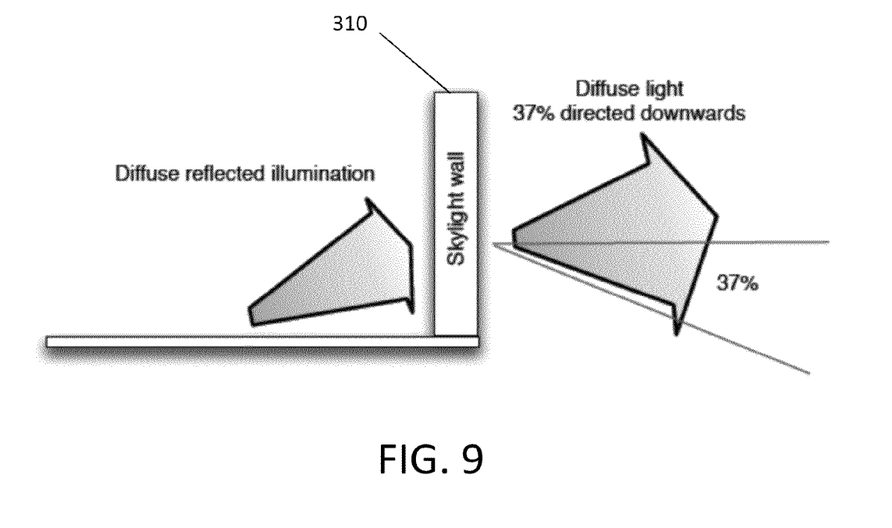
FIG. 9 is a schematic light diagram showing a portion of the effect on light passing through the wall of the skylight module of FIG. 1.
Figure 10:
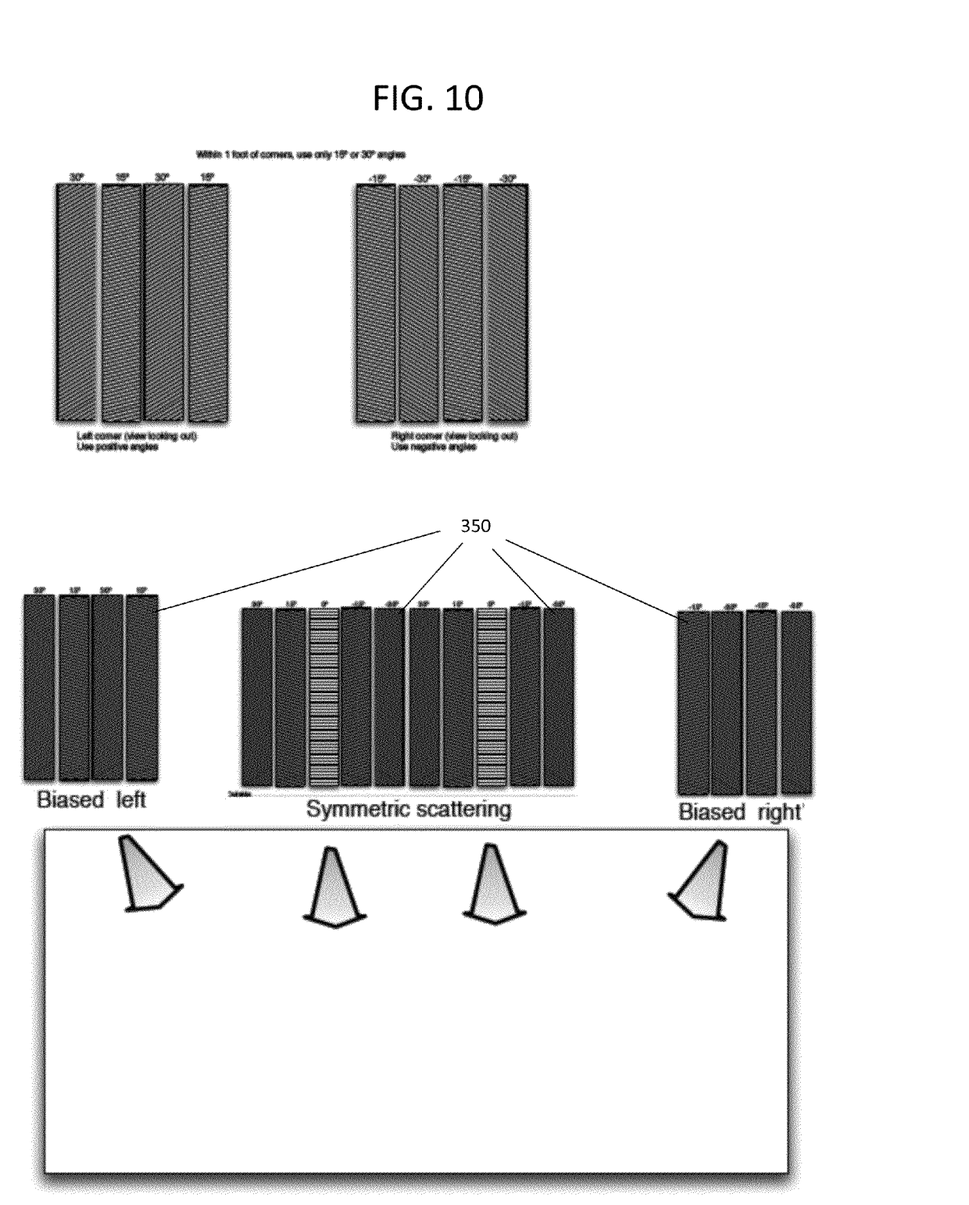
FIG. 10 is a schematic layout of the diffusing material of FIG. 7 for providing varying lighting effects.

For the diffuse light reflected from the roof surface, the combination of uniform scattering and biasing towards the normal allows 37% of the light that is transmitted through the vertical skylight wall 310 to be projected at an angle below horizontal and down into the space below the skylight, as shown in FIG. 9. It is also envisaged that such strips 350 of lenticular lens material may be used to direct the light in the desired horizontal direction. In FIG. 7, the axes of the lenticular lenses are shown varying by 15° from one polycarbonate cell to the next. By varying the angle of the lenticular lens relative to horizontal, the plane of the diffused light may be controlled. In the central part of the skylight wall 310, it is desired that the light be scatted uniformly relative to the normal vector of the panel. Near corners of the skylight, however, it is desirable to direct the light away from the adjacent side and towards the center of the skylight to reduce reflection losses. Thus, each of the corners of the skylight in the direction of the lenticular lenses can be biased up or down to preferentially focus the light away from the adjacent perpendicular wall and towards the center of the skylights, all as shown schematically in FIG. 10.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A skylight module comprising:
  a frame comprised of: a plurality of vertical walls, at least one of said vertical walls being comprised of a multi-wall polycarbonate panel and a plurality of light diffusing strips configured to simultaneously redirect downwardly directed light from the sun and upwardly directed light from a roof surface through the skylight module and into a space below the skylight module.

2. The skylight module of claim 1, wherein layers of said multi-wall polycarbonate panels are from 5 to 30 mils in thickness.

3. The skylight module of claim 1, wherein multi-walls inside of said multi-wall polycarbonate panels define a plurality of cells.

4. The skylight module of claim 3, wherein the plurality of light-diffusing strips placed into a plurality of said cells.

5. The skylight module of claim 4, wherein said strips are comprised of lenticular lenses having lens angles that vary from one strip to another.

6. The skylight module of claim 4, wherein said strips are positioned within at least one row of cells that is closest to an interior of the skylight module.

7. The skylight module of claim 1, wherein said walls are configured to extend below a waterproofing plane of a roof surface and down to a steel decking of a roof surface.

8. The skylight module of claim 1, wherein at least one of said walls is held between first and second metal sheets.

9. The skylight module of claim 8, wherein said first metal sheet is configured in a partial polygonal shape defining a perimeter and an opening on an interior of said perimeter, said skylight module further comprising a stiffener positioned within said opening.

10. The skylight module of claim 9, wherein said stiffener is positioned adjacent an inner face of said multi-wall polycarbonate panel.

11. The skylight module of claim 10, wherein a bottom face of said first metal sheet extends under said stiffener and said multi-wall polycarbonate panel.

12. The skylight module of claim 8, wherein said second metal sheet is positioned adjacent an outer face of said multi-wall polycarbonate panel.

13. The skylight module of claim 8, said skylight module further comprising a flexible rubber flashing strip configured to cover a seam at which said skylight module exits a roof in which said skylight module is installed.

14. The skylight module of claim 13, said flexible rubber flashing strip further comprising a first portion positioned against an outer face of said multi-wall polycarbonate panel.

15. The skylight module of claim 14, said flexible rubber flashing strip further comprising a second portion positioned against an outer face of said second metal sheet.

16. The skylight module of claim 15, said flexible rubber flashing strip further comprising a third portion configured to extend outward from said second portion and to sit atop an existing roofing membrane.

17. The skylight module of claim 16, wherein said flexible rubber flashing strip is affixed to said wall with a structural channel positioned against an outer face of said second portion of said flexible rubber flashing strip, wherein said structural channel is affixed to said wall.

18. The skylight module of claim 13, wherein said flexible rubber flashing strip comprises a reflective surface configured to reflect sunlight through said wall.

* * * * *